US 6,567,375 B2

(12) United States Patent
Balachandran et al.

(10) Patent No.: US 6,567,375 B2
(45) Date of Patent: May 20, 2003

(54) METHOD AND APPARATUS FOR PACKET SIZE DEPENDENT LINK ADAPTATION FOR WIRELESS PACKET

(75) Inventors: Krishna Balachandran, Middletown; Kirk K Chang, Morganville, both of NJ (US); Richard Paul Ejzak, Wheaton, IL (US); Wei Luo, Eatontown; Sanjiv Nanda, Clarksburg, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/750,834

(22) Filed: Dec. 29, 2000

(65) Prior Publication Data

US 2002/0036992 A1 Mar. 28, 2002

Related U.S. Application Data

(60) Provisional application No. 60/188,787, filed on Mar. 13, 2000.

(51) Int. Cl.[7] ............................................... A04Q 7/00
(52) U.S. Cl. ........................ 370/204; 370/336; 370/345; 370/465
(58) Field of Search ................................ 370/204, 328, 370/329, 352, 465, 493, 335, 342, 479, 225, 470, 336, 345; 455/455, 550, 552, 63, 69

(56) References Cited

U.S. PATENT DOCUMENTS

| | | | | |
|---|---|---|---|---|
| 5,909,469 A | * | 6/1999 | Frodigh et al. | 375/302 |
| 6,167,031 A | * | 12/2000 | Olofsson et al. | 370/252 |
| 6,275,488 B1 | * | 8/2001 | Cudak et al. | 370/347 |
| 6,307,867 B1 | * | 10/2001 | Roobol et al. | 370/470 |
| 6,308,082 B1 | * | 10/2001 | Kronestedt et al. | 455/550 |
| 2001/0056560 A1 | * | 12/2001 | Khan et al. | 714/746 |

* cited by examiner

Primary Examiner—Ricky Ngo

(57) ABSTRACT

Unlike earlier methods and systems in which Radio Link Control (RLC) performance was characterized in terms of the throughput, and the size of the higher layer Protocol Data Units (PDUs) or packets to be transferred was ignored, a method and apparatus is provided that is based on the delay of a higher layer PDU or packet. A method and apparatus so based have less delay than a method and apparatus based on employing adaptive coding and modulation to achieve the greatest mean throughput of a data block.

20 Claims, 3 Drawing Sheets

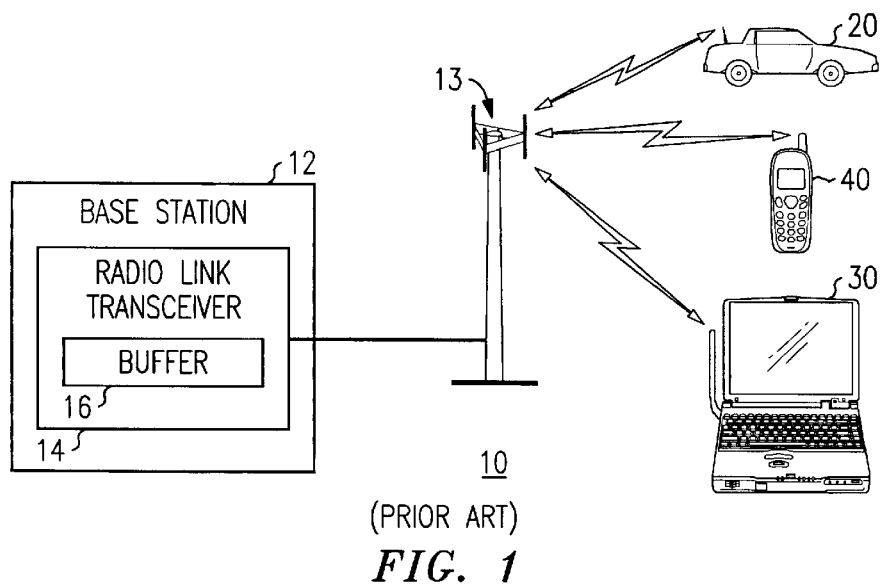
(PRIOR ART)
FIG. 1
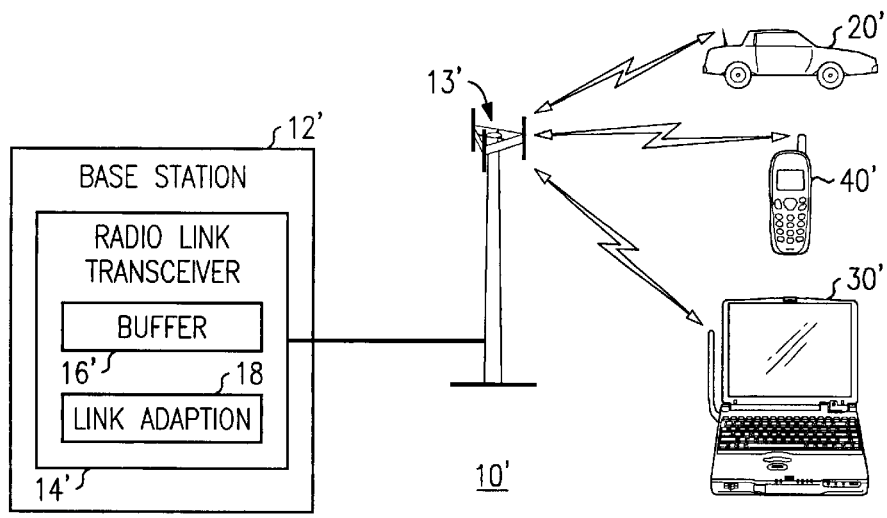
FIG. 2
| TABLE 1: SOME PARAMETERS USED IN COMPARISON OF MCS 5, MCS 6 AND MCS 7 | | | |
|---|---|---|---|
| | MCS 5 | MCS 6 | MCS 7 |
| PACKET SIZE (BITS) | 450 | 594 | 450 |
| B | 4 | 4 | 8 |
FIG. 3

DELAY OF PACKET SIZE 1 kbits

METHOD AND APPARATUS FOR PACKET SIZE DEPENDENT LINK ADAPTATION FOR WIRELESS PACKET

CROSS REFERENCE TO RELATED APPLICATION

This application claims priority of Provisional Application Ser. No. 60/188,787, which was filed on Mar. 13, 2000.

TECHNICAL FIELD

The invention relates to data systems communicating by wireless links and more particularly to adapting the size and coding of packets in order to reduce over-all delay when communicating data over the wireless links.

BACKGROUND OF THE INVENTION

In wireless packet data systems such as Enhanced General Packet Radio Service (EGPRS), selective Automatic Repeat Request (ARQ) is used for error recovery over the wireless link. In an earlier analysis, Radio Link Control (RLC) performance was usually characterized in terms of the throughput, while the size of the higher layer Protocol Data Units (PDUs) or packets to be transferred was ignored.

In wireless packet data systems, such as Enhanced General Packet Radio Service (EGPRS), selective ARQ is used for error recovery over the radio link, see for example K. Balachandran, R. Ejzak, and S. Nanda, "Efficient transmission of ARQ feedback for EGPRS radio link control," in *IEEE Vehicular Technology Conf.*, May 1999. Currently, nine Modulation and Coding Schemes (MCSs) have been proposed for EGPRS with MCS-1 having the most robust coding and MCS-9 having the least robust coding.

Each higher layer packet is segmented into multiple Radio Link Control (RLC) blocks. The RLC block size and the number of RLC blocks transmitted in a 20 ms block period vary depending on the MCS chosen for transmission. For example, the RLC block sizes for MCS-1 and MCS-2 are 22 octets and 28 octets, respectively. For MCS-1 to MCS-6, a single RLC block is transmitted in a 20 ms block period on each time slot. For MCS-7 to MCS-9, two RLC blocks are transmitted in a 20 ms block period on each time slot. This state of the art is known from: A. Furuskar, S. Mazur, F. Muller and H. Olofsson, "EDGE: enhanced data rates for GSM and TDMA/136 evolution," *IEEE personal Communications*, pp. 56–66, June 1999; ETSI GSM 03.60, "Digital cellular telecommunications system (phase 2+); General Packet Radio Service (GPRS); service description: stage 2"; and K. Balachandran, K. Conner, R. Ejzak, and S. Nanda, "A Proposal for EGPRS Radio Link Control Using Link Adaptation and Incremental Redundancy," *Bell Labs Technical Journal*, vol. 4, no. 3, pp. 19–36, July–September 1999. If mobile stations are multi-slot capable, then multiple time slots (up to 8 in EGPRS) are available for use.

The RLC Block Error Rate (BLER) can be reduced significantly by using more robust codes. The result of using robust schemes, such as MCS-1, is that fewer rounds of retransmission are required to complete a transmission. However, stronger coding reduces the number of data bits that can be transmitted in one RLC block. Less robust schemes such as MCS-9 are able to pack more bits in a single RLC block, but operate at higher BLERs under typical channel conditions and may require more retransmissions to complete a transmission. For Selective ARQ, the throughput upper bound is $R(1-P_e)$, where R is the transmission rate and $P_e$ is the block error rate. This applies well to the transfer of large amounts of data (for example file transfer protocol (ftp) applications). However, for applications such as web browsing and telnet, the concern is with the delay in transferring short packets. So, for transferring short packets, the long term throughput does not quantify the quality of service. In what follows, the EGPRS framework is assumed in order to study the tradeoffs between Forward Error Correction (FEC) and ARQ for different packet sizes from a delay perspective.

There have been several studies on the delay performance of selective repeat (SR) ARQ. In M. E. Anagnostou and E. N. Protonotarios, "Performance analysis of the selective repeat ARQ protocol," IEEE Trans. on Communications, vol. 34, no. 2, pp. 127–135, February 1986, an exact and an approximate analysis on RLC block delay was derived in the single slot case. In R. Fantacci, "Queueing analysis of the selective repeat automatic repeat request protocol wireless packet network," IEEE transactions on Vehicular technologies, vol. 45, no. 2, pp. 258–264, May 1996, the author analyzed the performance of the SR-ARQ in the Markov two-state channel. Another approximation can be found in J. Chang and T. Yang, "End-to-end delay of an adaptive selective repeat ARQ protocol," IEEE Transactions on Communications, vol. 42, no. 11, pp. 2926–2928, November 1994. In all the above referenced works, only delay for a block has been calculated.

The important measure is not the time (delay) for delivering a block of data. Rather, the important measure is the time (delay) to communicate a message. To come closer to the delay for a message, it is desirable to measure the delay for in-sequence delivery of a higher layer packet, which contains multiple RLC blocks. Once a measure of the delay times of in sequence delivery of higher level packets containing multiple blocks is achieved, improvements in the method and apparatus for communicating blocks of data in the imperfect world of wireless communications can be also be achieved. It is desirable to provide improvements to the method and apparatus for communicating messages made up of data blocks via wireless communications in imperfect transmission/reception channel conditions.

SUMMARY OF THE INVENTION

Briefly stated in accordance with one aspect of the invention, the aforementioned shortcoming of the art is overcome by providing a method for reducing delay time of data delivery comprising the steps of storing at least one data packet to be transmitted over a link; transmitting a first segment of the data packet at a first modulation and coding scheme level; and transmitting a second segment of the data packet at a second modulation and coding scheme level which is more robust.

In accordance with another aspect of the invention, the aforementioned shortcoming of the art is overcome by providing an apparatus for reducing delay time of data delivery, comprising a buffer for storing at least one data packet to be transmitted over a link and a modulator and coder for modulating and coding a first segment of the data packet at a first modulation-and-coding level. The modulator and coder also modulating and coding a second segment of the data packet at a second modulation-and-coding level which is more robust than the first modulation-and-coding level. The apparatus has a transmitter for transmitting the first and second segments. By using a more robust code for the second segment, the delay time to the user is reduced.

BRIEF DESCRIPTION OF THE DRAWING

FIG. 1 is a block diagram of a previously known wireless system.

FIG. 2 is a block diagram of a wireless system for practicing the invention.

FIG. 3 is a table of results for various MCS levels.

DETAILED DESCRIPTION

Figure 4:
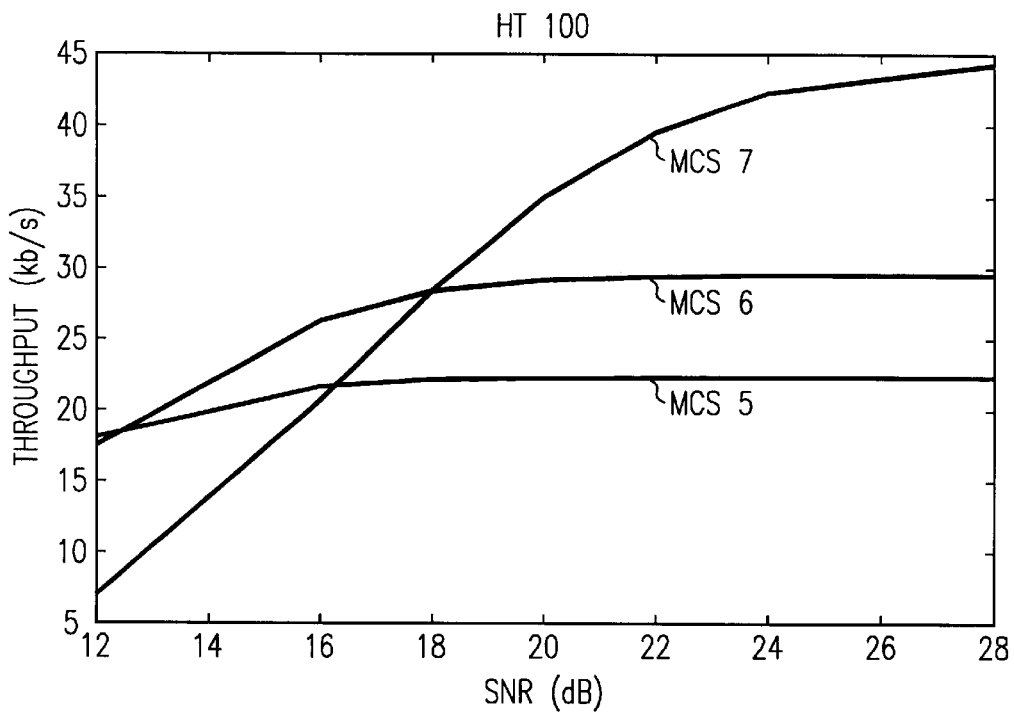
FIGS. 4–7 are results of simulations for various MCS levels.

Referring now to FIG. 1, system 10 has a base station 12 that is connected to an antenna 13. System 10 is an EGPRS system. Antenna 13 both transmits and receives wireless packet data over radio links. Antenna 13 is illustrated as communicating data packets to and from radio equipped automobile 20, wireless portable computer 30 and hand-held unit 40.

Base station 12 has a transceiver 14 for transmitting and receiving data with other units. Transceiver 14 has a buffer 16 in which it stores each message to be transmitted. The data of a message is held in buffer 16 until all of the message has been properly received, which is defined as received without uncorrectable errors, at the destination of the message, such as automobile 20, computer 30 or hand-held device 40. If a data block becomes lost or corrupted during initial transmission, a re-transmission is requested by the destination unit. Such re-transmission requests are then fulfilled from data in the buffer 16. Once all of the message has been delivered, the buffer 16 is either cleared or simply marked as invalid until it is overwritten with different, valid data. Since buffers and link control units controlling transmitting of data blocks have existed in previous systems, a major part of the present invention is a faster and more reliable method and system for providing data communications.

FIG. 2 shows a faster and more reliable method and system for data communications. Base station 12' has the additional link adaptation unit 18 to help provide the improvements. The link adaptation unit 18 has a buffer draining monitor (not shown). The buffer draining monitor determines the time when the data in buffer 16' is almost completely transmitted the first time. This is the time for the buffer draining monitor to signal the link adaptation unit 18 to change the MCS level of the transmission to a more robust one. Similarly, units 20', 30' and 40' in their requests-to-transmit all indicate the size of their respective messages to be transmitted. Link adaptation unit 18 takes a similar action to change the MCS level the transmitting unit 20', 30' or 40' is using as the end portion of the message is reached.

Link Adaptation unit 18 tests the radio link between the transceiver 14' and mobile units 20', 30' and 40' as a baseline way for radio link control (RLC) to operate. RLC at least selects an MCS level or levels to allow communication in the presence of noise on the radio link. As will be shown below, judicious RLC selection of MCS levels during a message can achieve significant time savings, i.e. delay savings. Additionally, an analysis of the delay performance of selective ARQ's as a function of packet size and the channel coding scheme is employed. The analysis has been verified through simulations, which have shown the advantages of the present invention.

The RLC ARQ procedure operates as follows. At a transmitter, e.g. transmitter 14', each packet provided by the higher layer is segmented into K RLC blocks, each of the K RLC blocks is assigned a sequence number. The RLC blocks are then queued in the transmitter buffer, e.g. buffer 16', in order to be scheduled for transmission. The transmitter maintains a window the size of which is incremented by one when an RLC block is transmitted and decremented by one when an RLC block is acknowledged as received in sequence by the receiver. It is assumed that there is a maximum window size of W blocks beyond which the window size cannot be incremented. At the initial transmission or retransmission of each RLC block, a timer (not shown) associated with that block is activated. If a block is negatively acknowledged after its timer expires, it is scheduled for retransmission. Ideally the timer is set equal to the round trip delay between transceiver 14' and units 20', 30' or 40', (or from one of the units 20', 30' or 40' to transceiver 14') which includes propagation and processing delays in both directions, to prevent propagation and processing retransmissions.

For example, if transmitter 14' polls receiver 20', 30' or 40', for feedback every P block periods, receiver 20', 30' or 40' responds with an ARQ feedback bitmap providing the ACK/NACK receipt status of each RLC block within the window. The ARQ feedback message also includes the sequence number up to which all RLC blocks have been received in sequence.

Further, for the below given analysis, the following assumptions are made:

1. A quantity of B RLC blocks can be transmitted within a 20 ms block period. This number is a function of the MCS and the multi-slot capability of the mobile station.
2. The probability of error for each RLC block is given by $P_e$ and RLC block errors are independent from one block to another block.
3. The timer expires after the round trip delay of T block periods.
4. The Window size W is greater than the size of the packet (i.e. W>K) so protocol stalling never occurs.
5. The polling period is P=1. So every 20 ms, the receiver sends back its reception status to the transmitter.
6. There are no errors in acknowledgments.
7. There are no undetected errors.

With these assumptions, the performance of system 10' between base station 12' and any unit 20', 30' or 40' may be characterized in terms of the packet delay (D) defined as the time period between the arrival of the packet at the RLC layer and the reception of acknowledgments to every RLC block comprising the packet.

Considering the operation conditions that each packet sees an empty buffer (e.g. buffer 16') when it arrives and there is no packet queuing delay. If only the delay in queuing, transmitting and acknowledging RLC blocks is considered, then the packet delay can be written as:

$$D = A \cdot T + \tau \quad (1)$$

where A can be approximated as $$A(K) \approx \begin{cases} 1 - \dfrac{\ln K}{\ln P_e}, & K \le BT \\ -\dfrac{\ln BT}{\ln P_e} - \dfrac{P_e}{1 - P_e} + \dfrac{K}{BT(1 - P_e)}, & K > BT \end{cases} \quad (2)$$

This is the approximation that is used for the delay in the rest of this description. An intuitive explanation of the approximation above for A(K) is as follows. The delay of a packet consists of two parts: the "draining delay" and the "tail delay". During each round trip delay period, if there is sufficient backlog, BT blocks are transmitted. On average, the residual number of blocks left for transmission decreases at a constant rate, i.e., by $BT(1-P_e)$, for every round trip period. Therefore, it takes $$\frac{K}{BT(1-P_e)}$$

round trips to drain the packet of size K. So the "draining delay" is $$\frac{K}{BT(1-P_e)}$$

round trips. However, when the residual number of blocks falls to less than BT, or if the packet length K is less than BT, the depletion rate is smaller than $BT(1-P_e)$, since in every round trip, there are not enough blocks to fill up the transmission interval. This "tail delay" depends on the number of round trips it takes to successfully transmit the remaining blocks when the error rate is $P_e$. If the packet size is less than BT, the total delay only consists of "tail delay" which is dependent on the packet size. For larger packets, the total delay consists of the draining delay for K-BT blocks and the tail delay for the last BT blocks. For packets of moderate size, the effect of "tail delay" can not be ignored, while the "tail delay" becomes negligible when packet size is large enough. This will be shown later.

Based on the approximate results for A(k), the delay expressions can be expressed in block periods. When the polling period is not 1, the delay can be approximated by $$T \approx \left\lceil \frac{RTD}{P} \right\rceil P$$

And delay of the packet of size (K) is $$D(K)=(A(K)+0.5)T$$

The above analysis is counter intuitive in some ways because the analysis shows that in order to reduce the overall time to send a communication a method and apparatus would change the MCS level from a higher throughput data transmission type of data blocks to a lower throughput type of data blocks.

To validate these counter intuitive results of the above analysis and the method and apparatus of the present invention, simulations were performed. The findings of these simulations were taken and used to guide the selection of modulation and coding schemes MCS in system 10', an EGPRS system, in order to reduce the packet delay between base station 12' and mobile stations 20', 30', and 40'.

In FIGS. 3 and 4 the results of a simulation and analysis for A are shown. FIG. 4 shows some parameters used in comparison of MCS5, MCS6 and MCS7, including the delay for MCS-7, the higher throughput coding scheme, in channel condition type HT-100(GSM hilly terrain model, 100 kmph mobile speed) with SNR equal to 12 dB, 18 dB, and 22 dB respectively. The round trip delay was 80 ms, i.e. T=4. Some of the parameters of the MCS codes are shown in FIG. 3 (Table 1). As can be seen, analysis results agree well with the simulation results. The advantages of the counter intuitive method and apparatus of the present invention were definitely validated by the simulation.

As mentioned before in the Background, the unfulfilled need for this invention was to provide an appropriate modulation and coding scheme (MCS) that minimizes user perceived delay. To examine such, FIGS. 5–7 show a numerical comparison of modulation and coding schemes MCS5 to MCS7.

Figure 5:
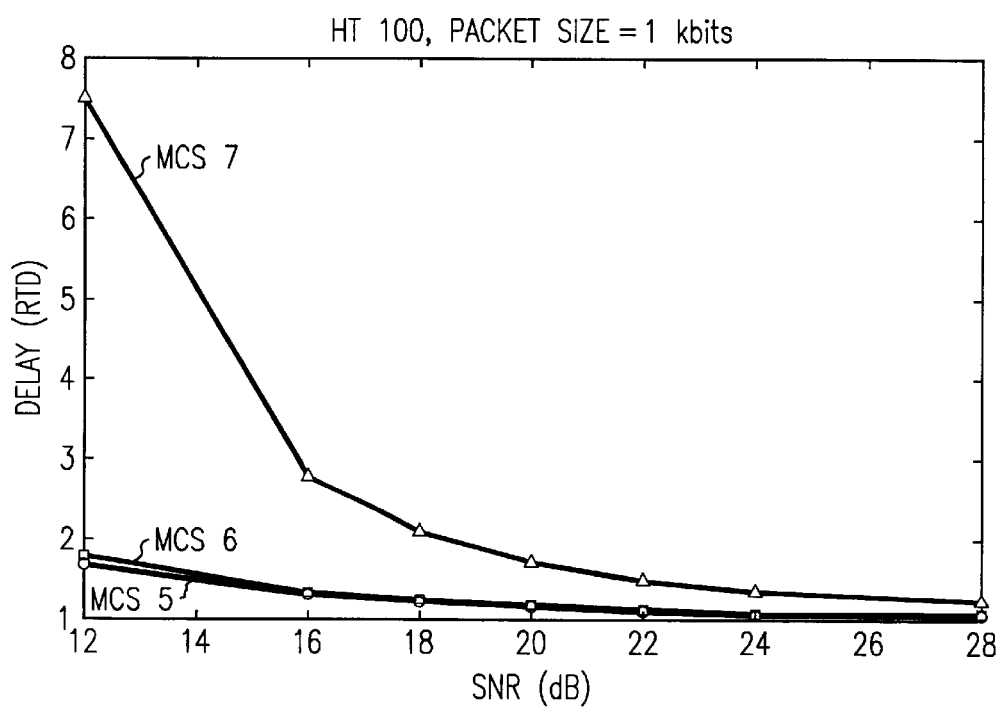
Figure 6:
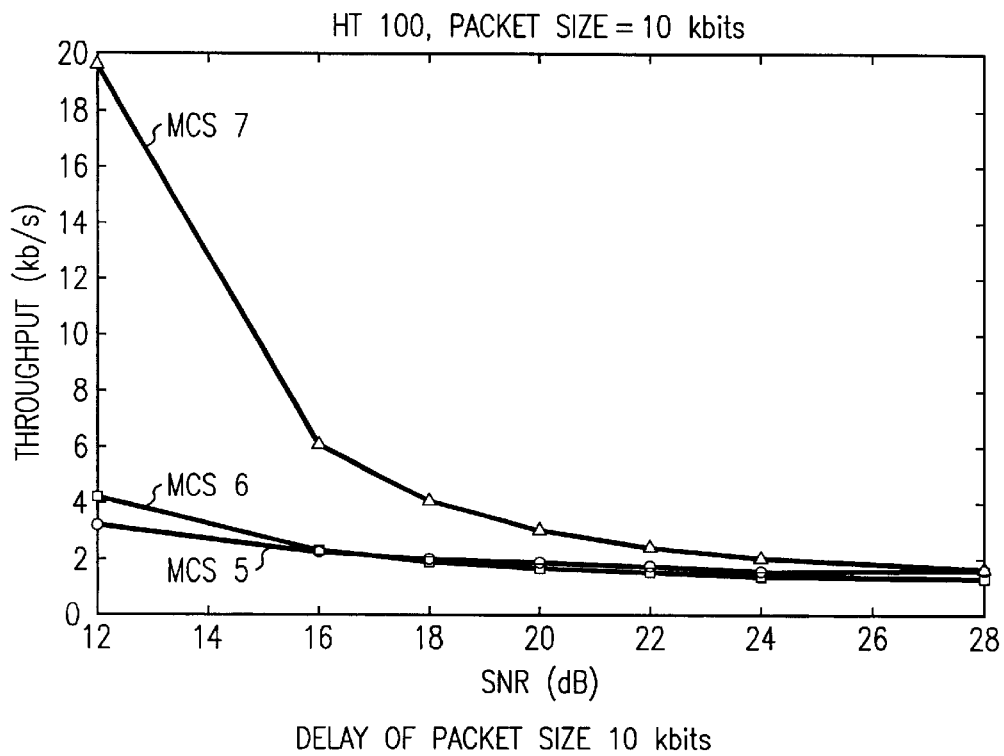
Figure 7:
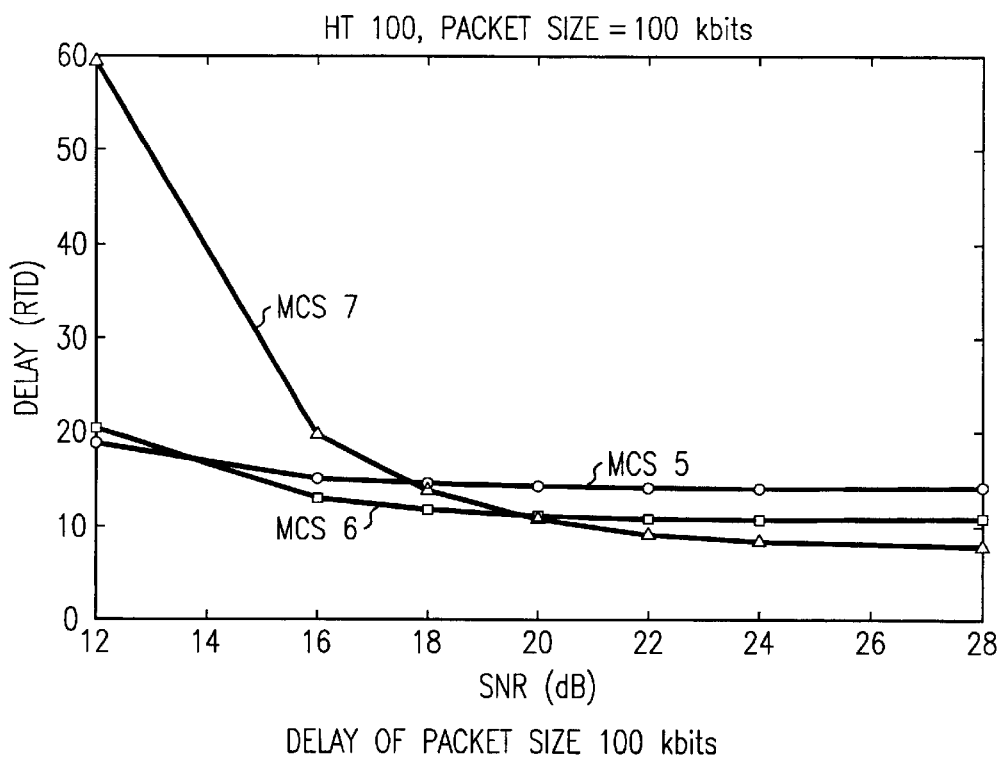

Through FIG. 5 to FIG. 7 modulation and coding schemes MCS-5, MCS-6 and MCS-7, which are used in EGPRS, are compared. In FIG. 5, the signal-to-noise ratio of the channel is 12 dB. Under these conditions, it can be observed that MCS-5 results in a lower delay than MCS-7 (i.e., stronger MCS-5 coding is preferable). When the channel signal to noise conditions improve (as shown in the FIGS.), the advantage of using MCS-5(the stronger code) diminishes. The trade-off between using more robust coding to combat channel loss and less robust coding to increase transmission rate becomes more visible for mobile wireless communications through the FIGS. 5–7. For a signal-to-noise ratio at 18 dB, MCS-6 performs the best among the three coding schemes when packet size is above 10 kbits. Under very good channel conditions (e.g. a signal-to-noise ratio of 22 dB as shown in FIG. 6), MCS-7 provides the best delay performance when the packet size is above 42 kbits.

Generally speaking, when the packet size is very small (about the size of BT), the most robust coding scheme (MCS5, in FIGS. 5–7) provides the best communication. As packet size increases, the crossover points to switch between different coding schemes occur. Where the crossover points are, depends on the tail delay, as well as the draining delay. When the packet size is large enough, the draining delay becomes the dominant factor, and the best modulation and coding scheme to yield the minimal delay is the one achieving the highest long-term throughput. Thus, modulation and coding scheme selection cannot be based purely on the basis of the throughput upper bound under the prevailing channel conditions as it had been selected by previous methods and systems. Instead, selection of a modulation and coding scheme needs to be adapted to the underlying applications being used, such as voice, FTP, telnet, web browsing, etc. and the channel condition in order to reduce delay.

The crossover points between coding schemes of a system are applicable to the case where a link is dedicated to a single user and the objective is to minimize the packet delay. For a shared channel, where the objective is to maximize the channel throughput, the crossovers between coding schemes would be different. Since the packet transmission consists of two phases, "draining" and "tail" phases. In the "draining" phase, packet size decreases at constant average rate. In the "tail" phase, the packet size decreases at a reduced rate, since in every round trip, there are not enough blocks to fill up the transmission interval. If there are multiple users statistically sharing a common channel, one user's idle slot may be filled by another user. When the system loading is high, the shared channel is never idle. Then the system of multiple users has each user draining his or her packet at the peak rate within his or her share of the channel. In such a case, the modulation and coding scheme should be chosen to maximize the "draining rate", i.e. the one with the greater long term throughput. The method and apparatus of the present invention will also help guide the selection of the appropriate modulation and coding schemes for the cases where the system loading is light or sharing of channels by users is not possible.

Thus, it will now be understood that there has been disclosed a heretofore unknown and counter intuitive method and arrangement for reducing delay in a system by increasing the robustness of coding over a segment of a packet. While the invention has been particularly illustrated and described with reference to preferred embodiments thereof, it will be understood by those skilled in the art that narrows changes in form, details and applications may be made therein. It is accordingly intended that the appended claims shall cover all such changes in form, details and applications which do not depart from the true spirit and scope of the invention.

We claim:

1. A method to reduce delay time of data delivery comprising the steps of:
   storing at least one data packet to be transmitted over a link;
   dividing the one data packet into a plurality of segments to be sequentially transmitted over the link;
   transmitting a first segment of the data packet at a first modulation and coding scheme level; and
   transmitting another segment of the data packet at a second modulation and coding scheme level which is different from the first modulation and coding scheme level, the selection of the second modulation and coding scheme level based on minimizing the total delay associated with the successful reception of all segments of the one data packet, the selection being based on parameters beyond data throughput over the link.

2. An apparatus to reduce delay time of data delivery, comprising:
   a buffer for storing at least one data packet to be transmitted over a link;
   a modulator and coder for modulating and coding a first segment of the data packet at a first modulation-and-coding level;
   the modulator and coder modulating and coding another segment of the data packet at a second modulation-and-coding level which differs from the first modulation-and-coding level;
   a link adaptor that selects the modulation and coding levels to be used for each segment of the one data packet to be transmitted, the link adaptor selecting the modulation and coding level to be used for transmission of a segment based on minimizing the total delay associated with the successful reception of all segments of the one data packet, the selection being based on parameters beyond data throughput over the link,
   and a transmitter transmitting the first and second segments.

3. A data communication system for sending user data packets of varying length over a communication channel, comprising:
   means for segmenting each data packet for transmission on the communication channel;
   means for using link adaptation to select different modulation-and-coding-schemes for transmission of each data segment;
   means for selecting the modulation-and-coding-scheme for transmission of each packet based on both the channel quality and minimizing the total delay associated with the receipt of all segments of a data packet.

4. The system of claim 3, where each packet size is known, and the MCS is chosen for lower expected delay per packet.

5. A data communication system for sending user data packets of varying length over a communication channel, comprising:
   means for segmenting each data packet for transmission on the communication channel;
   means for using link adaptation to select different modulation-and-coding schemes (MCS) for transmission of each data segment;
   means for selecting the modulation-coding-scheme for transmission of each packet based on both the channel quality and the packet delay performance objective,
   where each packet size is known, and the MCS is chosen for lower expected delay per packet and where the MCS is chosen for lower delay per packet for x% of the packets where x depends on a desired quality of service.

6. The system of claim 4, wherein the MCS is chosen for a lower value of $\mu+a\sigma$ where $\mu$ denotes the expected delay per packet, $\sigma$ denotes the standard deviation of delay and a>0 is chosen depending on the desired quality of service.

7. A data communication system for sending user data packets of varying length over a communication channel, comprising:
   means for segmenting each data packet for transmission on the communication channel;
   means for using link adaptation to select different modulation-and-coding-schemes (MCS) for transmission of each data segment;
   means for selecting the modulation-and-coding-scheme for transmission of each packet based on both the channel quality and the packet delay performance objective, wherein the MCS is also based on a round trip delay time of the channel.

8. A data communication system for sending user data packets of varying length over a communication channel, comprising:
   means for segmenting each data packet for transmission on the communication channel;
   means for using link adaptation to select different modulation-and-coding-schemes (MCS) for transmission of each data segment;
   means for selecting the modulation-and-coding-scheme for transmission of each packet based on both the channel quality and the packet delay performance objective, wherein the MCS is also based on a typical packet size, rather than an actual packet size.

9. The system of claim 8, wherein the MCS is chosen for a lower expected delay per packet.

10. A data communication system for sending user data packets of varying length over a communication channel, comprising:
    means for segmenting each data packet for transmission on the communication channel;
    means for using link adaptation to select different modulation-and-coding-schemes (MCS) for transmission of each data segment;
    means for selecting the modulation-and-coding-scheme for transmission of each packet based on both the channel quality and the packet delay performance objective., wherein the MCS is determined based on a buffer backlog of user data and a lower expected delay in transmitting remaining data.

11. The system of claim 10, wherein one MCS is chosen when a buffer backlog is greater than x, and wherein another MCS is chosen when a buffer backlog is less than y.

12. A data communication system for sending user data packets of varying length over a communication channel, comprising:
    means for segmenting each data packet for transmission on the communication channel;
    means for using link adaptation to select different modulation-and-coding-schemes (MCS) for transmission of each data segment;
    means for selecting the modulation-and-coding-scheme for transmission of each packet based on both for channel quality and the packet delay performance objective, wherein the MCS is determined based on a buffer backlog of user data per packet and a lower expected delay in transmitting each packet.

13. The system of claim 12, wherein one MCS is chosen when a buffer backlog is greater than x, and wherein another MCS is chosen when a buffer backlog is less than y.

14. The system of claim 13, where x equals y.

15. The system of claim 13, wherein x is determined such that the MCS that results in the lowest expected delay also results in the highest expected throughput.

16. A method for data communication by data packets of varying length over a communication channel, comprising the steps of:

segmenting each data packet for transmission on the communication channel; and determining a modulation-and-coding-scheme from a plurality of modulation and coding schemes for transmission of each data segment according to link adaptation that selects the modulation and coding levels to be used for each data segment based on minimize the total delay associated with the successful reception of all segments of the data packet, the selection being based on parameters beyond data throughput over the communication channel.

17. The method of claim 16, wherein said determination of the modulation-and-coding-scheme for transmission of each packet segment is based on both channel quality and packet delay performance.

18. The method of claim 16, wherein said determination of the modulation-and-coding-scheme for transmission of each packet segment is based on channel quality.

19. The method of claim 16, wherein said communication channel is a radio frequency channel in which transmission conditions are subject to continuing changes due to environmental changes.

20. The apparatus of claim 2, wherein said link is a radio frequency channel in which transmission conditions are subject to continuing changes due to environmental changes.

* * * * *